United States Patent
Davies

(10) Patent No.: US 11,619,168 B2
(45) Date of Patent: Apr. 4, 2023

(54) GAS TURBINE ENGINE LUBRICATION SYSTEM

(71) Applicant: ROLLS-ROYCE plc, London (GB)

(72) Inventor: Neil J. Davies, Derby (GB)

(73) Assignee: Rolls Royce PLC, London (GB)

( * ) Notice: Subject to any disclaimer, the term of this patent is extended or adjusted under 35 U.S.C. 154(b) by 76 days.

(21) Appl. No.: 17/220,332

(22) Filed: Apr. 1, 2021

(65) Prior Publication Data

US 2021/0332754 A1 Oct. 28, 2021

(30) Foreign Application Priority Data

Apr. 23, 2020 (GB) ...................................... 2005916

(51) Int. Cl.
*F02C 7/06* (2006.01)
*F01D 25/20* (2006.01)

(52) U.S. Cl.
CPC ................ *F02C 7/06* (2013.01); *F01D 25/20* (2013.01); *F05D 2220/323* (2013.01); *F05D 2260/98* (2013.01)

(58) Field of Classification Search
CPC ...... F02C 7/06; F01D 25/20; F05D 2220/323; F05D 2260/98
USPC ......................................................... 415/175
See application file for complete search history.

(56) References Cited

U.S. PATENT DOCUMENTS 1,717,814 A 6/1929 Strong et al.
5,918,628 A * 7/1999 Harding .................. F02C 7/232
  137/538

2013/0121854 A1 5/2013 Thiel et al.
2014/0331639 A1 11/2014 Raimarckers et al.
2016/0032772 A1* 2/2016 Sheridan ................. F01D 15/12
  416/171
2016/0146048 A1* 5/2016 Valva .................. F16H 57/0495
  416/1
2018/0306062 A1 10/2018 Avis et al.
(Continued)

FOREIGN PATENT DOCUMENTS

AT 399922 B 8/1995
EP 3557009 A1 10/2019

OTHER PUBLICATIONS

Great Britain search report dated Aug. 28, 2020, issued in GB Patent Application No. 2005916.8.
(Continued)

*Primary Examiner* — Yi-Kai Wang
(74) *Attorney, Agent, or Firm* — Shumaker & Sieffert, P.A.

(57) ABSTRACT

A system for supplying lubricant to a component of a gas turbine engine is provided. The system includes a first fluid circuit having a first pump drivably couplable to a fan shaft of the engine for pumping a lubricant from a lubricant tank to the component. The first fluid circuit allows only a unidirectional flow of the lubricant from the lubricant tank to the component via the first pump. The system also includes a second fluid circuit having a second pump drivably couplable to the fan shaft for pumping the lubricant from the component to the lubricant tank. The second fluid circuit allows only a unidirectional flow of the lubricant from the component to the lubricant tank via the second pump. First and second ports of the two pumps operate as input ports or output ports depending on the rotation direction of the fan shaft.

16 Claims, 9 Drawing Sheets

(56) References Cited

U.S. PATENT DOCUMENTS

2019/0316522 A1* 10/2019 Menczykalski ........... F02C 7/32
2021/0131321 A1* 5/2021 Tomescu ................ F01D 25/20

OTHER PUBLICATIONS

European search report dated Sep. 8, 2021, issued in EP Patent Application No. 21164167.

* cited by examiner

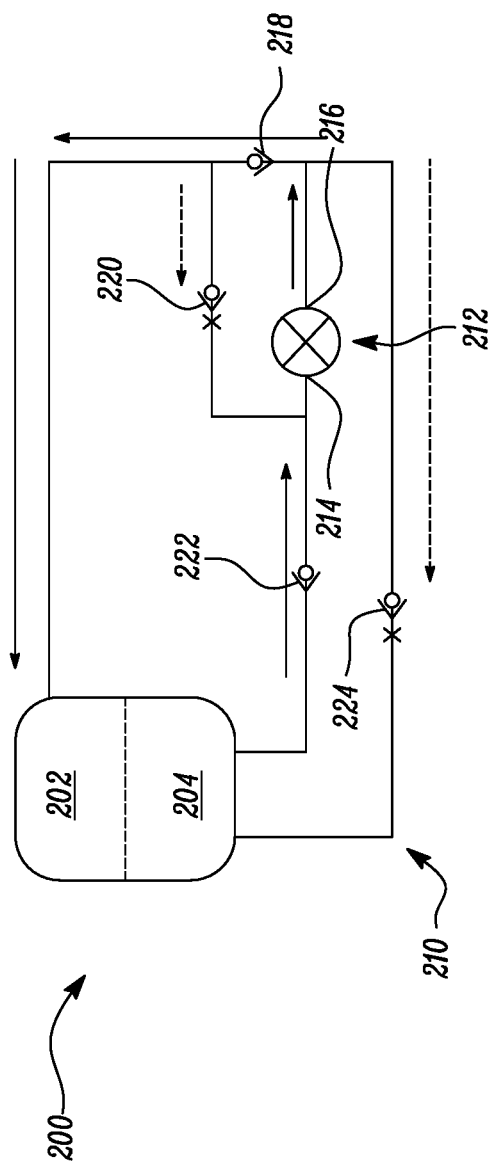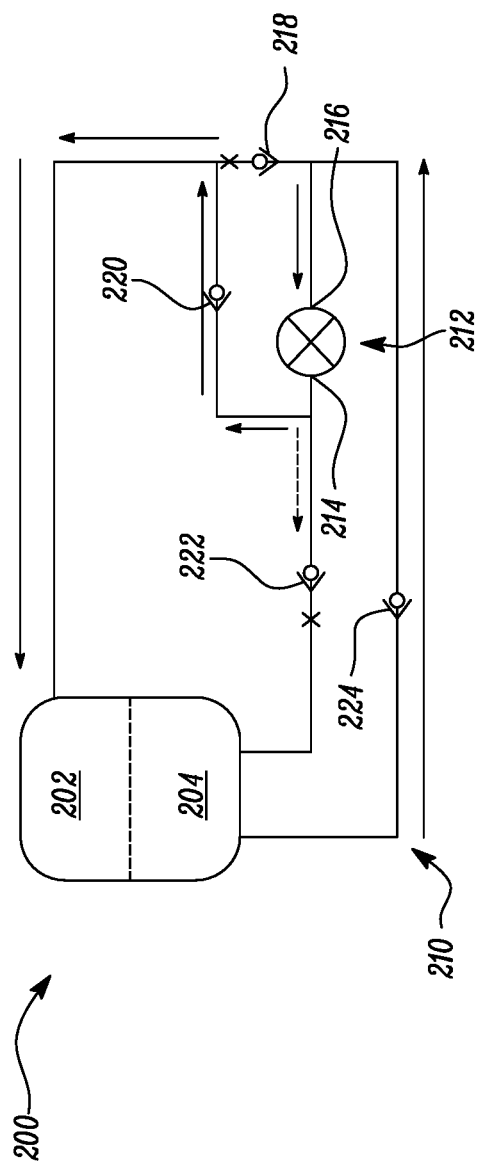
FIG. 5A
FIG. 5B

GAS TURBINE ENGINE LUBRICATION SYSTEM

CROSS-REFERENCE TO RELATED APPLICATIONS

This specification is based upon and claims the benefit of priority from United Kingdom Patent Application No. 2005916.8, filed on 23 Apr. 2020, the entire contents of which are incorporated herein by reference.

BACKGROUND

Technical Field

The present disclosure relates to a system for supplying lubricant, and in particular to a system for supplying lubricant to a component of a gas turbine engine.

Description of the Related Art

A gas turbine engine typically includes a fan, a compressor section, a combustor section and a turbine section. Air entering the compressor section is compressed and delivered into the combustion section where it is mixed with fuel and ignited to generate an exhaust gas flow. The exhaust gas flow expands through the turbine section to drive the compressor and the fan.

A speed reduction device, such as a gearbox, may be utilized to drive the fan so that the fan may rotate at a speed different than the turbine section. Various components of the gearbox, such as bearings, may require lubrication during operation of the gas turbine engine.

The gearbox may also require lubrication when the gas turbine engine is not operational. For example, air moving through the non-operating engine may rotate the fan, clockwise or anti-clockwise depending on the direction of the air relative to the fan. This effect is sometimes referred to as 'windmilling'. Windmilling can occur if the gas turbine engine is shut down during flight of an aircraft. In other cases, when the aircraft is stationary on the ground, wind moving though the gas turbine engine may cause windmilling. Even though the gas turbine engine is not operating, rotation of the fan (in the clockwise or the anticlockwise directions) may necessitate lubrication of the gearbox.

SUMMARY

According to a first aspect there is provided a system for supplying lubricant to a component of a gas turbine engine having a fan shaft and a lubricant tank. The system includes a first fluid circuit which includes a first pump drivably couplable to the fan shaft for pumping a lubricant from the lubricant tank to the component. The first pump has a first port and a second port. The first fluid circuit is arranged to allow a flow of the lubricant from the lubricant tank to the component via the first pump and prevent a flow of the lubricant from the component to the lubricant tank. Further, the system includes a second fluid circuit which includes a second pump drivably couplable to the fan shaft for pumping the lubricant from the component to the lubricant tank. The second pump has a first port and a second port. The second fluid circuit is arranged to allow a flow of the lubricant from the component to the lubricant tank via the second pump and prevent a flow of the lubricant from the lubricant tank to the component. The first pump receives the lubricant from the lubricant tank through its first port and discharges the lubricant to the component through its second port when the fan shaft rotates in a forward direction. The first pump receives the lubricant from the lubricant tank through its second port and discharges the lubricant to the component through its first port when the fan shaft rotates in a reverse direction opposite to the forward direction. The second pump receives the lubricant from the component through its first port and discharges the lubricant to the lubricant tank through its second port when the fan shaft rotates in the forward direction. The second pump receives the lubricant from the component through its second port and discharges the lubricant to the lubricant tank through its first port when the fan shaft rotates in the reverse direction.

The system may allow lubricant to be provided to the component independent of the direction of the fan shaft, i.e., for both the forward direction and the reverse direction. The system may therefore supply the lubricant to the component during "windmilling" and associated conditions which involve a non-operating state of the gas turbine engine. The system may provide lubricant to the component in the event of interruption in supply of lubricant from a main source. The component that requires lubrication may be a Power Gearbox (PGB) component, such as journal bearings, gear teeth, and so forth. The system may allow lubricant to be returned from the component to the lubricant tank even when the component is located remote from the lubricant tank, for example if the used lubricant cannot be returned to the lubricant tank using gravity.

The first fluid circuit may include a first non-return valve (NRV) disposed in fluid communication between the second port of the first pump and the component. The first NRV may allow unidirectional flow from the second port of the first pump to the component. The first fluid circuit may include a second NRV disposed in fluid communication between the first port of the first pump and the component. The second NRV may allow unidirectional flow from the first port of the first pump to the component. The first fluid circuit may include a third NRV disposed in fluid communication between the lubricant tank and the first port of the first pump. The third NRV may allow unidirectional flow from the lubricant tank to the first port of the first pump. The first fluid circuit may include a fourth NRV disposed in fluid communication between the lubricant tank and the second port of the first pump. The fourth NRV may allow unidirectional flow from the lubricant tank to the second port of the first pump.

The multiple NRVs of the first fluid circuit may ensure that the lubricant flows from the lubricant tank to the component and not in the opposite direction, and do so independent of the direction of rotation of the fan.

The first fluid circuit may further include a pressure release valve disposed in fluid communication between the first pump and the lubricant tank. The pressure release valve may allow a unidirectional flow from the first pump to the lubricant tank when a fluid pressure in the first circuit exceeds a predetermined value. The pressure release valve may act as a spill line to avoid excessive lubricant flow to the component at high fan rotation speed and to avoid build-up of undesirably high pressure within the first fluid circuit.

The first fluid circuit may further include a flow restrictor disposed in fluid communication between the first pump and the component to restrict a flow rate of lubricant from the lubricant tank to the component to a predetermined value. The flow restrictor may restrict the flow rate of lubricant within the first fluid circuit. Restricting the flow rate to the predetermined value may allow safe and efficient working of the various components within the first fluid circuit.

At least one of the first NRV, the second NRV, the third NRV and the fourth NRV of the first fluid circuit may prevent all fluid flow below a predetermined pressure. Each of the NRVs may prevent all fluid flow below a predetermined pressure.

The second fluid circuit may include a first NRV disposed in fluid communication between the second port of the second pump and the lubricant tank. The first NRV of the second fluid circuit may allow unidirectional flow from the second port of the second pump to the lubricant tank. The second fluid circuit may include a second NRV disposed in fluid communication between the first port of the second pump and the lubricant tank. The second NRV of the second fluid circuit may allow unidirectional flow from the first port of the second pump to the lubricant tank. The second fluid circuit may include a third NRV disposed in fluid communication between the component and the first port of the second pump. The third NRV of the second fluid circuit may allow unidirectional flow from the component to the first port of the second pump. The second fluid circuit may include a fourth NRV disposed in fluid communication between the component and the second port of the second pump. The fourth NRV of the second fluid circuit may allow unidirectional flow from the component to the second port of the second pump.

The multiple NRVs of the second fluid circuit may ensure that the lubricant flows from the component to the lubricant tank and not in the opposite direction, and do so independent of the direction of rotation of the fan.

At least one of the first NRV, the second NRV, the third NRV and the fourth NRV of the second fluid circuit may prevent all fluid flow below a predetermined pressure. Each of the NRVs may prevent all fluid flow below a predetermined pressure.

The predetermined pressure may be less than or equal to about 10 psi (about 70 kPa). Specifically, the predetermined pressure of each NRV of the first and second fluid circuits may be less than or equal to about 10 psi. The predetermined pressure may be a cracking pressure of a corresponding NRV in order to prevent any lubricant flow at low speeds of the corresponding first or second pumps (such as below 100 rpm speed).

Each of the first pump and the second pump may be a bi-directional pump. In some examples, each of the first pump and the second pump may be a gear pump.

According to a second aspect there is provided a gas turbine engine for an aircraft. The gas turbine engine includes a fan shaft rotatable in a forward direction and a reverse direction opposite to the forward direction. The gas turbine engine includes a component requiring lubrication, and a lubricant tank located remote from the component. The gas turbine engine further includes the system of the first aspect. The fan shaft is drivably coupled to the first pump and the second pump of the system. The first pump is operable to pump the lubricant from the lubricant tank to the component. The second pump is operable to pump the lubricant from the component to the lubricant tank.

The gas turbine engine may further include a gearbox drivably coupled to the fan shaft. The component requiring lubrication may be a journal bearing of the gearbox.

According to a third aspect there is provided an aircraft including the gas turbine engine of the second aspect.

The gas turbine of the present disclosure includes fan shaft-driven pumps (i.e., the first pump and the second pump) to supply lubricant for both the forward direction and the reverse direction of rotation of the fan shaft. This may ensure lubrication of the component during "windmilling" and associated scenarios. Further, the lubricant is returned to the lubricant tank, which may be separate from as well as remote from the component.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 5A is a schematic view of a system including a pump drivably coupled to a fan shaft rotating in a forward direction;

FIG. 5B is a schematic view of the system of FIG. 5A with the fan shaft rotating in a reverse direction;

DETAILED DESCRIPTION

Aspects and embodiments of the present disclosure will now be discussed with reference to the accompanying figures. Further aspects and embodiments will be apparent to those skilled in the art.

Figure 1:
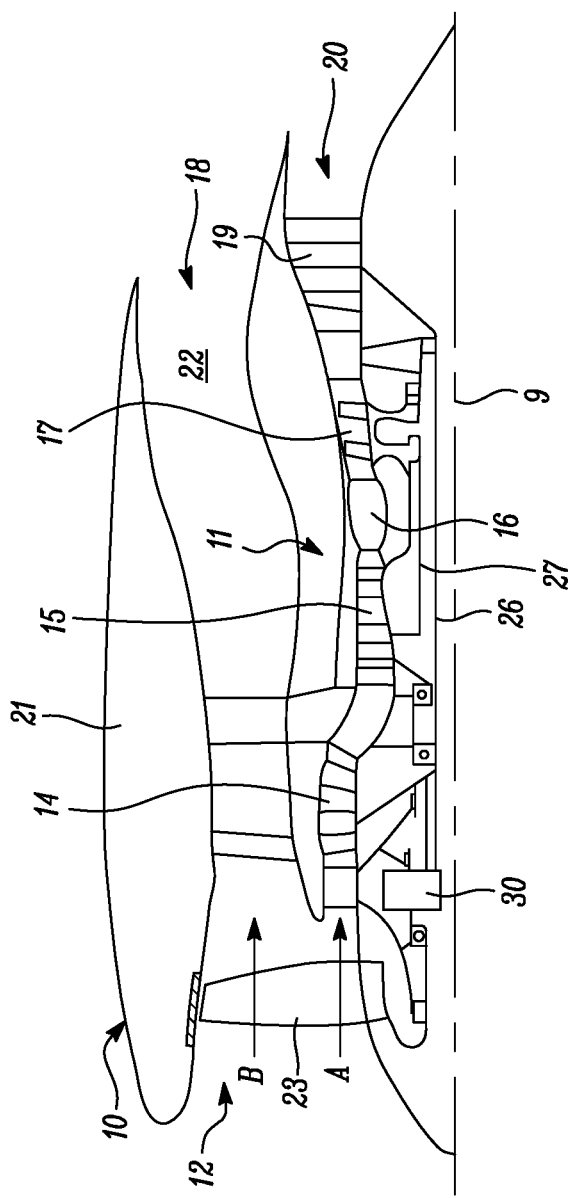
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 (alternatively, a fan shaft 26) and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
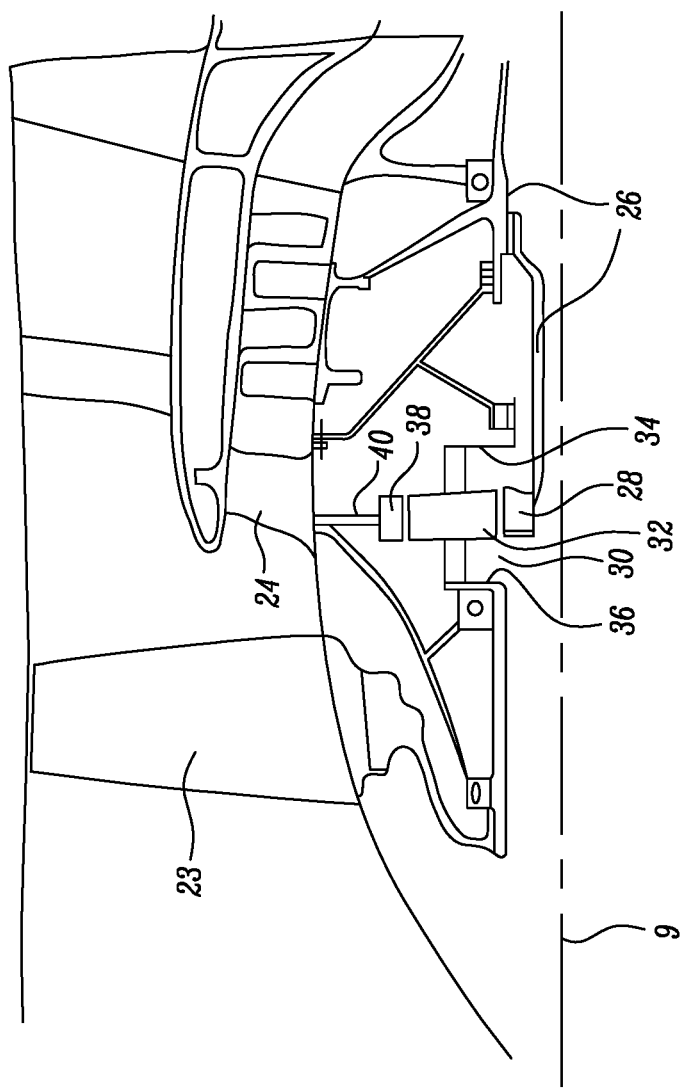
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor"

referred to herein may alternatively be known as the "intermediate pressure turbine" and "intermediate pressure compressor". Where such alternative nomenclature is used, the fan 23 may be referred to as a first, or lowest pressure, compression stage.

Figure 3:
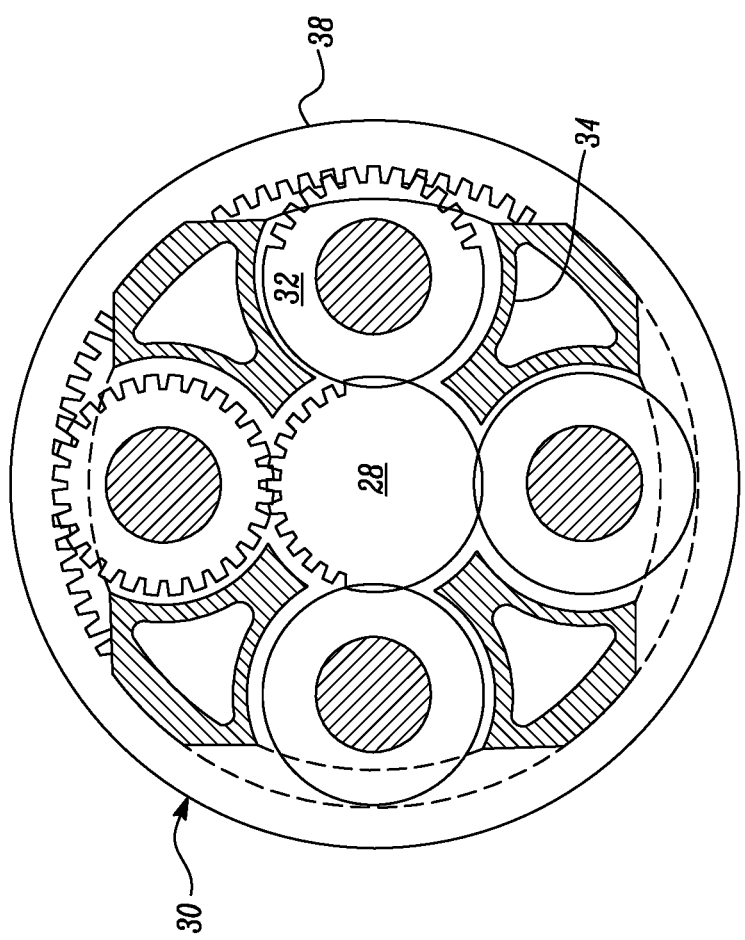
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Figure 4:
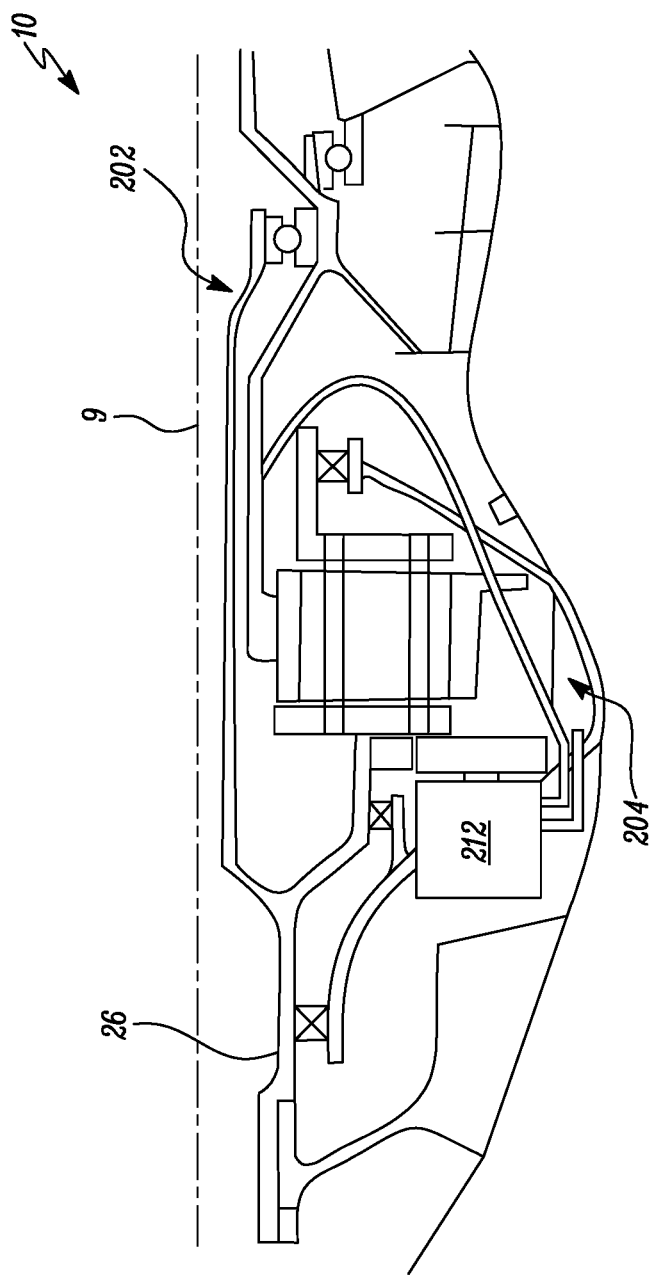
FIG. 4 is a schematic sectional view of a lower portion of a gas turbine engine.

FIG. 4 illustrates a portion of a gas turbine engine 10 including a component 202 requiring lubrication, a fan shaft 26 and a lubricant source 204. The component 202 requiring lubrication may include one or more power gearbox components. The component 202 may include one or more bearings, for example, journal bearings, roller bearings etc. The component 202 may also include gear teeth. In some examples, the lubricant may be supplied to movable and intermeshed components of the gearbox 30 of FIGS. 2 and 3.

As shown in FIG. 4, a pump 212 is fluidly disposed between the lubricant source 204 and the component 202. One or more fluid conduits are provided between pump 212 and the lubricant source 204. Further, one or more fluid conduits are provided between the pump 212 and the component 202. The lubricant source 204 may be a bearing sump. Used lubricant may drain from the component 202 to the lubricant source 204 without requiring any additional pump, for example using gravity. In some other examples, described herein with reference to FIGS. 7-9, a second pump 332 may be used along with a first pump 312 to pump used lubricant back to the lubricant source 204.

The fan shaft 26 can rotate in a forward direction and a reverse direction opposite to the forward direction. The term "reverse direction" is used in contrast to the "forward direction". The forward direction is the 'normal' rotation direction of the fan, that is to say the direction the fan rotates when it is driven by the gas turbine engine 10. The forward direction may be clockwise or anti-clockwise, depending on the design of the engine, and the reverse direction is the opposite of the forward direction. When not being driven, the fan shaft 26 may rotate (or "windmill") in either of the two directions, for example due to the direction of incident wind on the fan.

FIG. 5A illustrates a system 200 including the pump 212 drivably coupled to the fan shaft 26 (not shown in FIG. 5A). In FIG. 5A the fan shaft 26 is rotating in the forward direction. The system 200 includes a fluid circuit 210 which includes the pump 212 for pumping the lubricant from the lubricant source 204 to the component 202. The pump 212 includes a first port 214 and a second port 216. The pump 212 receives the lubricant from the lubricant source 204 through the first port 214 and discharges the lubricant to the component 202 through the second port 216 when the fan shaft 26 rotates in the forward direction, as shown in FIG. 5A. Therefore, when the fan shaft 26 rotates in the forward direction, the first port 214 is the inlet port of the pump 212, while the second port 216 is the outlet port of the pump 212.

When the fan shaft 26 rotates in the reverse direction opposite to the forward direction, as illustrated in FIG. 5B, the pump 212 receives the lubricant from the lubricant source 204 through the second port 216 and discharges the lubricant to the component 202 through the first port 214. That is, the functions of the first port 214 and the second port 216 swap when the rotational direction of the fan shaft 26 reverses. Therefore, when the fan shaft 26 rotates in the reverse direction, the first port 214 is the outlet port of the pump 212, while the second port 216 is the inlet port of the pump 212.

The fluid circuit 210 is arranged to allow a flow of the lubricant from the lubricant source 204 to the component 202 via the pump 212 and to prevent a flow of the lubricant back to the lubricant source 204 independent of the direction of rotation of the fan shaft 26. FIGS. 5A and 5B illustrate flow of the lubricant within the fluid circuit 210 by means of solid arrows (i.e., "———▶"), while dashed arrows (i.e. "-----▶") and "x" indicate reverse flow paths blocked by non-return valves (NRVs).

Used lubricant (that is, lubricant that has already been pumped to the component and performed its function) drains from the component 202 to the lubricant source 204. In some cases no additional pumping is required to return lubricant from the component 202 to the source 204, for example if a bearing chamber from which used lubricant drains is located above a bearing sump 204 such that gravity feeds the sump.

The fluid circuit 210 includes a first NRV 218 disposed in fluid communication between the second port 216 of the pump 212 and the component 202. The first NRV 218 allows unidirectional flow from the second port 216 of the pump 212 to the component 202. The first fluid circuit 210 further includes a second NRV 220 disposed in fluid communication between the first port 214 of the pump 212 and the component 202. The second NRV 220 allows unidirectional flow from the first port 214 of the pump 212 to the component 202. The fluid circuit 210 further includes a third NRV 222 disposed in fluid communication between the lubricant source 204 and the first port 214 of the pump 212. The third NRV 222 allows unidirectional flow from the lubricant source 204 to the first port 214 of the pump 212. Further, the fluid circuit 210 includes a fourth NRV 224 disposed in fluid communication between the lubricant source 204 and the second port 216 of the pump 212. The fourth NRV 224 allows unidirectional flow from the lubricant source 204 to the second port 216 of the pump 212.

Referring to FIG. 5A, during forward rotation of the fan shaft 26 the second NRV 220 and the fourth NRV 224 block the return flow of the lubricant, while the first NRV 218 and the third NRV 222 allow the forward flow of the lubricant from the lubricant source 204 to the component 202 via the pump 212. Specifically, the third NRV 222 allows the flow of the lubricant from the lubricant source 204 to the first port 214 (i.e. the inlet port) while the first NRV 218 allows the flow of the lubricant from the second port 216 (i.e. the outlet port) to the component 202. The second NRV 220 blocks the return flow of lubricant to the first port 214 (i.e., the inlet port), while the fourth NRV 224 blocks the return flow of the lubricant from the second port 216 (i.e., the outlet port) to the lubricant source 204.

Therefore, when the fan shaft 26 rotates in the forward direction, the first, second, third and fourth NRVs 218, 220, 222, 224 ensure that the pump 212 receives the lubricant from the lubricant source 204 through the first port 214 and discharges the lubricant to the component 202 through the second port 216, and ensure that the return flow of lubricant back to the first port 214 and back to the lubricant source 204 does not occur.

Referring to FIG. 5B, during reverse rotation of the fan shaft 26 the second NRV 220 and the fourth NRV 224 allow the forward flow of the lubricant from the lubricant source 204 to the component 202 via the pump 212, while the first NRV 218 and the third NRV 222 block the return flow of the lubricant. Specifically, the fourth NRV 224 allows the flow of the lubricant from the lubricant source 204 to the second port 216 (i.e., the inlet port) while the second NRV 220 allows the flow of the lubricant from the first port 214 (i.e., the outlet port) to the component 202. The first NRV 218 blocks the return flow of the lubricant from the first port 214 (i.e. the outlet port) to the second port 216 (i.e. the inlet port), while the third NRV 222 blocks the return flow of the lubricant from the first port 214 (i.e. the outlet port) to the lubricant source 204.

Therefore, when the fan shaft 26 rotates in the reverse direction, the first, second, third and fourth NRVs 218, 220, 222, 224 ensure that the pump 212 receives the lubricant from the lubricant source 204 through the second port 216 and discharges the lubricant to the component 202 through the first port 214, and ensures that the return flow of lubricant back to the second port 216 and back to the lubricant source 204 does not occur.

In some examples, at least one of the first, second, third and fourth NRVs 218, 220, 222, 224 of the fluid circuit 210 may have a predetermined cracking pressure and therefore prevent all fluid flow below the predetermined pressure. In some other examples, more than one or each of the NRVs may prevent all fluid flow below a predetermined pressure. In some examples the predetermined pressure is less than or equal to about 10 psi (about 70 kPa). However, the predetermined pressure can have any other value in accordance with the application requirements of the system 200.

Figure 6:
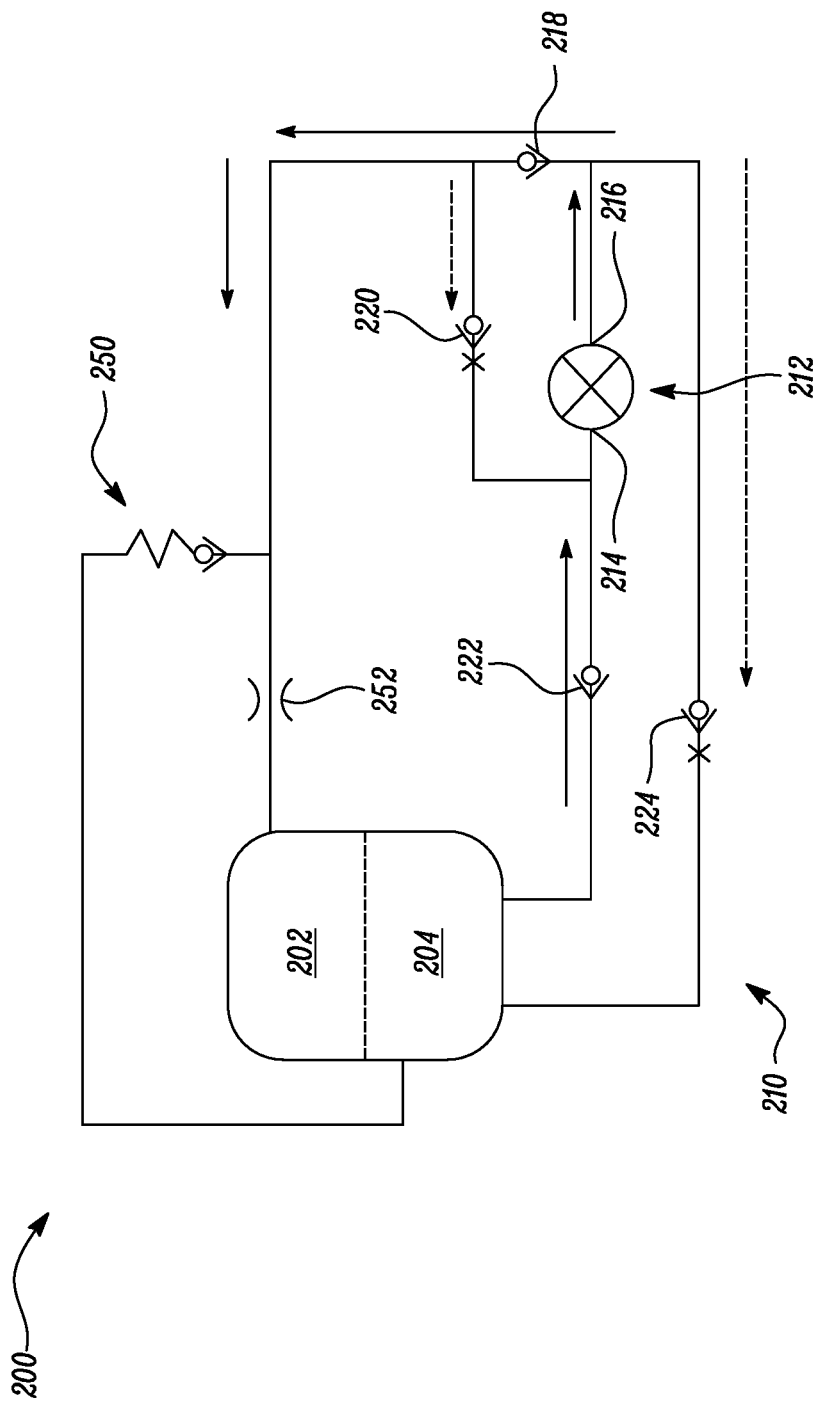
FIG. 6 is a schematic view of the system of FIG. 5A further including a pressure relief valve and a flow restrictor.

FIG. 6 illustrates another example in which the system 200 further includes a pressure release valve 250 and a flow restrictor 252. Note that in FIG. 6 the fan shaft 26 is rotating in the forward direction.

In this example the fluid circuit 210 includes a flow restrictor 252 disposed in fluid communication between the pump 212 and the component 202 to restrict a flow rate of lubricant from the lubricant source 204 to the component 202 to a predetermined value. The fluid circuit 210 also includes a pressure release valve 250, located in a parallel path not present in FIGS. 5A-5B and disposed in fluid communication between the pump 212 and the lubricant source 204. The pressure release valve 250 allows a unidirectional flow from the pump 212 to the lubricant source 204 when a fluid pressure in the fluid circuit 210 exceeds a predetermined value. In this way, the parallel path provides an alternative route for lubricant discharged from the pump 212, taking it to the lubricant source 204 instead of the component 202, in the event the pressure in the fluid circuit 210 exceeds the predetermined value. The predetermined value can be any value in accordance with the application requirements of the system 200. Both or only one of the flow restrictor 252 and the pressure release valve 250 may be provided.

Figure 7:
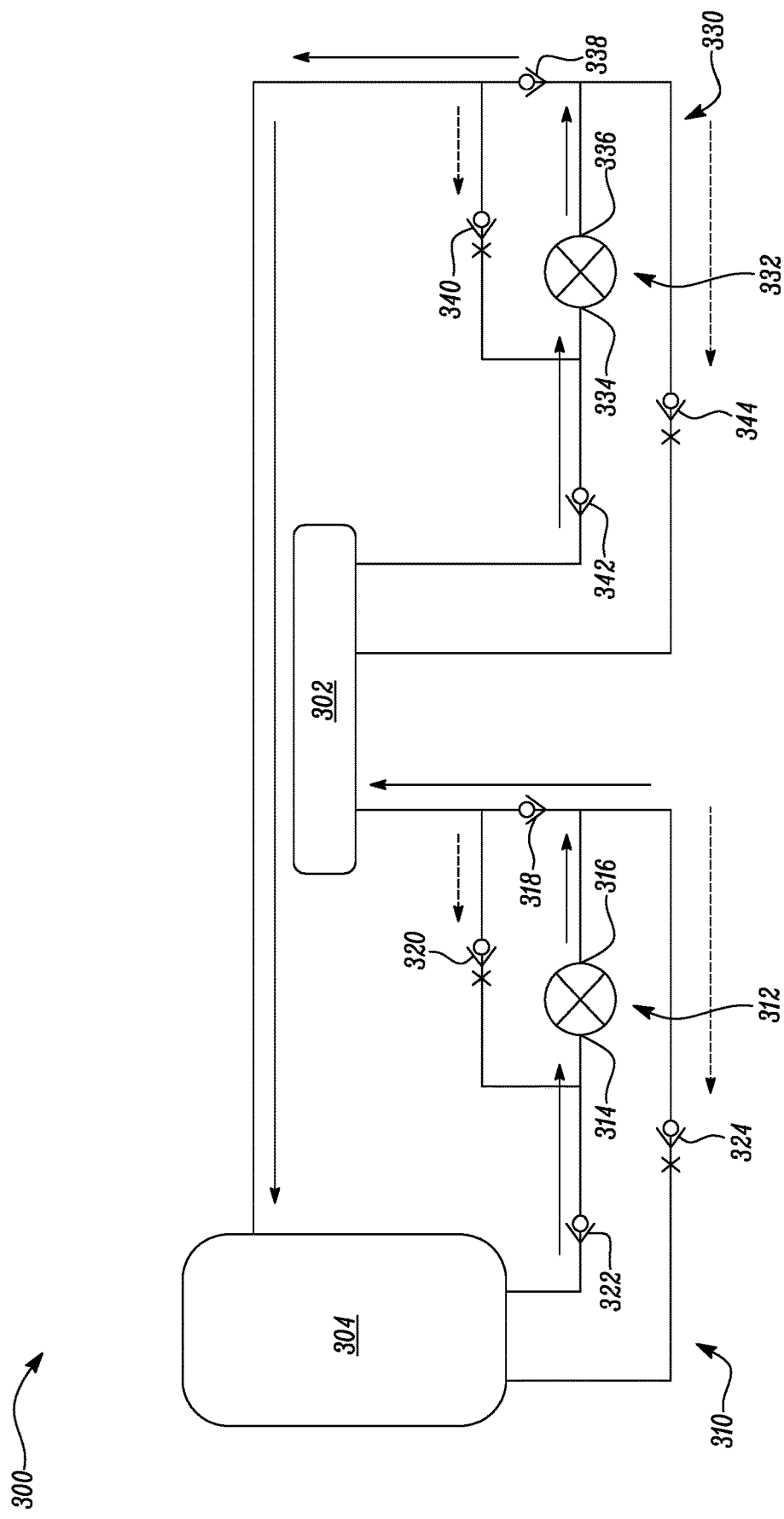
FIG. 7 is a schematic view of a system including a first pump and a second pump drivably coupled to a fan shaft rotating in a forward direction.

FIG. 7 illustrates another system 300 that includes two pumps, a first pump 312 and a second pump 332. In this example a lubricant source 304 is a tank separate from and located remotely from the component 302. The system 300 may therefore require additional pumping to transport the used lubricant from the component 302 to the lubricant tank 304. This additional pumping is provided by the second pump 332.

The system 300 includes a first fluid circuit 310 which includes the first pump 312. The first pump 312, which is drivably coupled to the fan shaft 26 (not shown in FIG. 7), is operable to pump lubricant from a lubricant tank 304 to a component 302. The first pump 312 includes a first port 314 and a second port 316. The first pump 312 receives the lubricant from the lubricant tank 304 through the first port 314 and discharges the lubricant to the component 302 through the second port 316 when the fan shaft 26 rotates in a forward direction, as shown in FIG. 7. Therefore, when the fan shaft 26 rotates in the forward direction, the first port 314 is the inlet port of the first pump 312, while the second port 316 is the outlet port of the first pump 312.

The system 300 also includes a second fluid circuit 330 which includes the second pump 332. The second pump 332, which is drivably coupled to the fan shaft 26, is operable to pump used lubricant from the component 302 to the lubricant tank 304. The second pump 332 includes a first port 334 and a second port 336. The second pump 332 receives the lubricant from the component 302 through the first port 334 and discharges the lubricant to the lubricant tank 304 through the second port 336 when the fan shaft 26 rotates in the forward direction. Therefore, when the fan shaft 26 rotates in the forward direction, the first port 334 is the inlet port of the second pump 332, while the second port 336 is the outlet port of the second pump 332.

Figure 8:
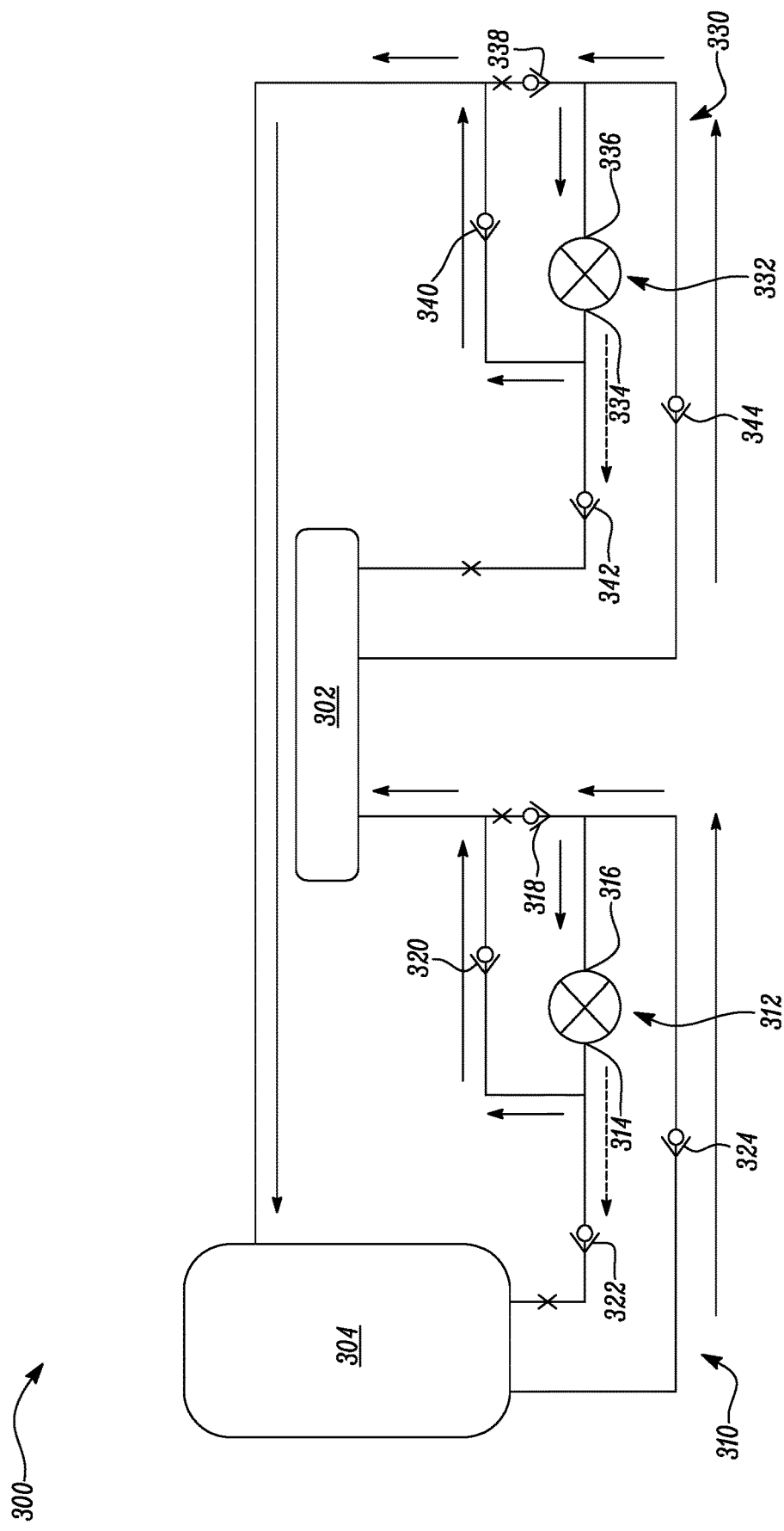
FIG. 8 is a schematic view of the system of FIG. 7 with the fan shaft rotating in a reverse direction.

FIG. 8 illustrates the system 300 with the fan shaft 26 rotating in the reverse direction opposite to the forward direction. With the fan rotating in the reverse direction, the first pump 312 receives the lubricant from the lubricant tank 304 through the second port 316 and discharges the lubricant to the component 302 through the first port 314. That is, the functions of the first port 314 and the second port 316 swap when the rotational direction of the fan shaft 26 reverses. Therefore, when the fan shaft 26 rotates in the reverse direction, the first port 314 is the outlet port of the first pump 312, while the second port 316 is the inlet port of the first pump 312.

The second pump 332 receives lubricant from the component 302 through the second port 336 and discharges lubricant to the lubricant tank 304 through the first port 334 when the fan shaft 26 rotates in the reverse direction. That is, the functions of the first port 334 and the second port 336 swap when the rotational direction of the fan shaft 26 reverses. Therefore, when the fan shaft 26 rotates in the forward direction, the first port 334 is the outlet port of the second pump 332, while the second port 336 is the inlet port of the second pump 332.

Referring to both FIGS. 7 and 8, the first fluid circuit 310 is arranged to allow a flow of the lubricant from the lubricant tank 304 to the component 302 via the first pump 312 and prevent a reverse flow of the lubricant back to the lubricant tank 304, and to do so independent of the direction of rotation of the fan shaft 26 that drives the first pump 312. The second fluid circuit 330 is arranged to allow a flow of the lubricant from the component 302 to the lubricant tank 304 via the second pump 332 and prevent a reverse flow of the lubricant back to the component 302, and to do so independent of the direction of rotation of the fan shaft 26 that drives the second pump.

FIGS. 7 and 8 illustrate flow of the lubricant within the first fluid circuit 310 and the second fluid circuit 330 by means of solid arrows (i.e. "⟶"), while dashed arrows (i.e. "⇢") and "x" indicate reverse flow paths blocked by NRVs.

The first fluid circuit 310 includes a first NRV 318 disposed in fluid communication between the second port 316 of the first pump 312 and the component 302. The first NRV 318 allows unidirectional flow from the second port 316 of the first pump 312 to the component 302. The first fluid circuit 310 further includes a second NRV 320 disposed in fluid communication between the first port 314 of the first pump 312 and the component 302. The second NRV 320 allows unidirectional flow from the first port 314 of the first pump 312 to the component 302. The first fluid circuit 310 further includes a third NRV 322 disposed in fluid communication between the lubricant tank 304 and the first port 314 of the first pump 312. The third NRV 322 allows unidirectional flow from the lubricant tank 304 to the first port 314 of the first pump 312. Further, the first fluid circuit 310 includes a fourth NRV 324 disposed in fluid communication between the lubricant tank 304 and the second port 316 of the first pump 312. The fourth NRV 324 allows unidirectional flow from the lubricant tank 304 to the second port 316 of the first pump 312.

The second fluid circuit 330 includes a first NRV 338 disposed in fluid communication between the second port 336 of the second pump 332 and the lubricant tank 304. The first NRV 338 of the second fluid circuit 330 allows unidirectional flow from the second port 336 of the second pump 332 to the lubricant tank 304. The second fluid circuit 330 further includes a second NRV 340 disposed in fluid communication between the first port 334 of the second pump 332 and the lubricant tank 304. The second NRV 340 of the second fluid circuit 330 allows unidirectional flow from the first port 334 of the second pump 332 to the lubricant tank 304. The second fluid circuit 330 further includes a third NRV 342 disposed in fluid communication between the component 302 and the first port 334 of the second pump 332. The third NRV 342 of the second fluid circuit 330 allows unidirectional flow from the component 302 to the first port 334 of the second pump 332. The second fluid circuit 330 further includes a fourth NRV 344 disposed in fluid communication between the component 302 and the second port 336 of the second pump 332. The fourth NRV 344 of the second fluid circuit 330 allows unidirectional flow from the component 302 to the second port 336 of the second pump 332.

Referring to first fluid circuit 310 in FIG. 7, with the fan shaft 26 rotating in the forward direction the second NRV 320 and the fourth NRV 324 block the reverse flow of the lubricant, while the first NRV 318 and the third NRV 322 allow the forward flow of the lubricant from the lubricant tank 304 to the component 302 via the first pump 312. Specifically, the third NRV 322 allows the forward flow of the lubricant from the lubricant tank 304 to the first port 314 of the first pump 312, while the first NRV 318 allows the flow of the lubricant from the second port 316 of the first pump 312 to the component 302. The second NRV 320 blocks the reverse flow of the lubricant from the second port 316 (i.e. the outlet port) to the first port 314 (i.e., the inlet port) of the first pump 312, while the fourth NRV 324 blocks the reverse flow of the lubricant from the second port 316 (i.e., the outlet port) of the first pump 312 to the lubricant tank 304.

Therefore, when the fan shaft 26 rotates in the forward direction, the first, second, third and fourth NRVs 318, 320, 322, 324 ensure that the first pump 312 receives the lubricant from the lubricant tank 304 through the first port 314 and discharges the lubricant to the component 302 through the second port 316, and ensure that the return flow of lubricant back to the first port 314 and back to the lubricant source 304 does not occur.

Now referring to the second fluid circuit 330 in FIG. 7, with the fan shaft 26 rotating in the forward direction the second NRV 340 and the fourth NRV 344 block the reverse flow of the lubricant, while the first NRV 338 and the third NRV valve 342 allow the forward flow of the lubricant from the component 302 to the lubricant tank 304 via the second pump 332. Specifically, the third NRV 342 allows the flow of the lubricant from the component 302 to the first port 334 (i.e., the inlet port) of the second pump 332, while the first non-return valve 338 allows the flow of the lubricant from the second port 336 (i.e., the outlet port) of the second pump 332 to the lubricant tank 304. The second NRV 340 blocks the reverse flow of the lubricant from the second port 336 (i.e., the outlet port) to the first port 334 (i.e., the inlet port) of the second pump 332, while the fourth NRV 344 blocks the reverse flow of the lubricant from the second port 336 (i.e., the outlet port) of the second pump 332 to the component 302.

Therefore, when the fan shaft 26 rotates in the forward direction, the first, second, third and fourth NRVs 338, 340, 342, 344 ensure that the second pump 332 receives the lubricant from the component 302 through the first port 334 and discharges the lubricant to the lubricant tank 304 through the second port 336, and ensure that the return flow of lubricant back to the first port 314 and back to the lubricant source 304 does not occur.

Now referring to the first fluid circuit 310 in FIG. 8, during the reverse rotation of the fan shaft 26 the first NRV 318 and the third NRV 322 block the reverse flow of the lubricant, while the second NRV 320 and the fourth NRV 324 allow the forward flow of the lubricant from the lubricant tank 304 to the component 302 via the first pump. Specifically, the fourth NRV 324 allows the flow of the lubricant from the lubricant source 304 to the second port 316 (i.e., the inlet port), while the second NRV 320 allows the flow of the lubricant from the first port 314 (i.e., the outlet port) to the component 302. The first NRV 318 blocks the reverse flow of the lubricant from the first port 314 (i.e., the outlet port) to the lubricant source 304, while the third NRV 322 blocks the reverse flow of the lubricant from the first port 314 to the lubricant source 304.

Therefore, when the fan shaft 26 rotates in the reverse direction, the first, second, third and fourth NRVs 318, 320, 322, 324 ensure that the first pump 312 receives the lubricant from the lubricant source 304 through the second port 316 and discharges the lubricant to the component 302 through the first port 314, and ensure that the return flow of lubricant back to the second port 316 and back to the lubricant source 304 does not occur.

Now referring to the second fluid circuit 330 in FIG. 8, during the reverse rotation of the fan shaft 26 the first NRV 338 and the third NRV 342 block the reverse flow of the lubricant, while the second NRV 340 and the fourth NRV 344 allow the forward flow of the lubricant from the component 302 to the lubricant tank 304 via the second pump 332. Specifically, the fourth NRV 344 allows the flow of the lubricant from the component 302 to the second port 336 (i.e., the inlet port), while the second NRV 340 allows the flow of the lubricant from the first port 334 (i.e., the outlet port) to the lubricant tank 304. The first NRV 338 blocks the reverse flow of the lubricant from the first port 334 (i.e., the outlet port) to the component 302, while the third NRV 342 blocks the reverse flow of the lubricant from the first port 334 (i.e., the outlet port) back to the component 302.

Therefore, when the fan shaft 26 rotates in the reverse direction, the first, second, third and fourth NRVs 338, 340, 342, 344 ensure that the second pump 332 receives the lubricant from the component 302 through the second port 336 and discharges the lubricant to the lubricant tank 304 through the first port 334, and ensure that the return flow of lubricant back to the second port 336 and back to the component 302 does not occur.

In some examples, at least one of the first, second, third and fourth NRVs 318, 320, 322, 324 of the first fluid circuit 310 may have a predetermined cracking pressure and therefore prevent all fluid flow below the predetermined pressure. In some other examples, more than one or each of the NRVs 318, 320, 322, 324 prevent all fluid flow below a predetermined pressure. At least one of the first, second, third and fourth NRVs 338, 340, 342, 344 of the second fluid circuit 330 may have a predetermined cracking pressure and therefore prevent all fluid flow below a predetermined pressure. In some other examples, more than one or each of the NRVs 338, 340, 342, 344 may prevent all fluid flow below a predetermined pressure. The predetermined pressure may less than or equal to 10 psi. However, the predetermined pressure can have any other value in accordance with the application requirements of the system 300.

Figure 9:
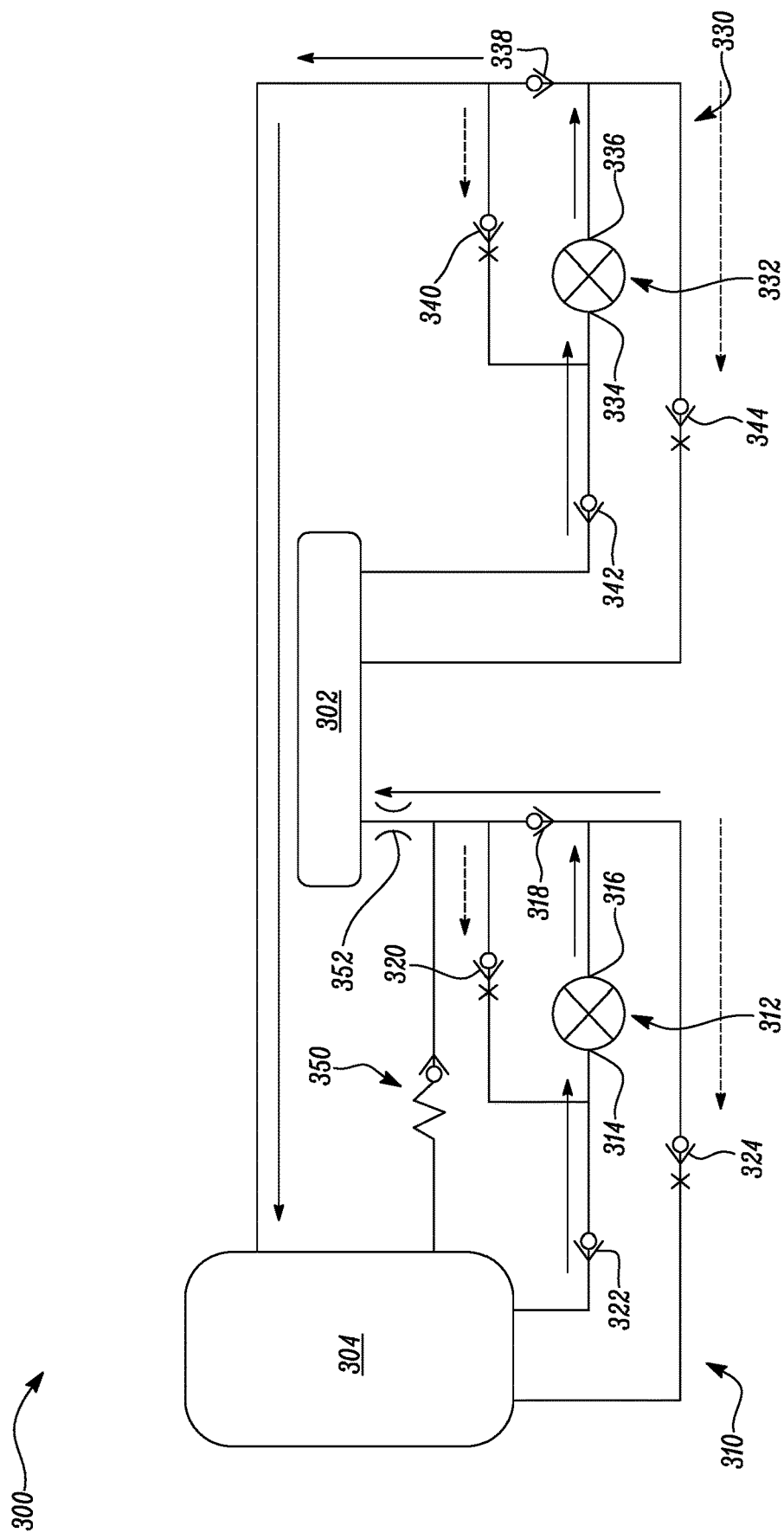
FIG. 9 is a schematic view of the system of FIG. 7 further including a pressure relief valve and a flow restrictor.

FIG. 9 illustrates another example in which the system 300 further includes a pressure release valve 350 and a flow restrictor 352. Note that in FIG. 9 the fan shaft 26 rotating in the forward direction.

The first fluid circuit 310 further includes a flow restrictor 352 disposed in fluid communication between the first pump 312 and the component 302 to restrict a flow rate of lubricant from the lubricant tank 304 to the component 302 to a predetermined value. The predetermined value may be chosen in accordance with application requirements of the system 300. The first fluid circuit 310 also includes a pressure release valve 350, located in a parallel path not present in FIGS. 7-8 and disposed in fluid communication between the first pump 312 and the lubricant tank 304. The pressure release valve 350 allows a unidirectional flow from the first pump 312 to the lubricant tank 304 when a fluid pressure in the first circuit 310 exceeds a predetermined value. In this way, the parallel path provides an alternative route for lubricant discharged from the first pump 312, taking it to the lubricant tank 304 instead of the component 302, in the event the pressure in the first fluid circuit 310 exceeds the predetermined value. The predetermined value may be chosen in accordance with application requirements of the system 300. As can be seen from FIG. 9, the parallel path may be connected in parallel across the flow restrictor 352. Both or only one of the flow restrictor 352 and the pressure release valve 350 may be provided.

Referring to FIGS. 4-9, in some examples, one or more of the NRVs used in the systems 200, 300 can be check valves. The check valves can be one or more of a ball check valve, a diaphragm check valve, a swing check valve, a stop-check valve or a duckbill valve.

Each of the pumps 212, 312, 332 may be one of a gear pump, a gear rotor pump or a vane pump. In some examples, each of the first pump 312 and the second pump 332 is a bi-directional pump, for example any bi-directional pump known or used in the art. More particularly, each of the pumps 212, 312, 332 may include at least one of a gerotor pump, a rotary vane pump, a lobe pump, a circumferential piston pump, a screw pump, a radial plunger pump, a swashplate pump, a flexible member, an eccentric piston pump, and so forth.

Each of the pumps 212, 312, 332 may be drivably coupled to the fan shaft 26 by, for example, a gear drive, a friction drive, a chain drive, a belt drive, or combinations thereof.

It should be appreciated that while specific arrangements of the fluid circuits 210, 310, 330 have been described, alternative arrangements providing the same functions are possible. For example, fluid circuits having different fluid paths and branches between the lubricant source 204, 304, pumps 212, 312, 332 and component 202,302, and having different arrangements of NRVs, flow restrictors and pressure release valves are possible. The arrangements described above are exemplary implementations of the functions of the fluid circuits and are not intended to limit the scope of the invention, which is defined by the appended claims.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A system for supplying lubricant to a component of a gas turbine engine, the system comprising:
   a first fluid circuit comprising a first pump drivably couplable to a fan shaft of the engine for pumping a lubricant from a lubricant tank to the component, the first pump having a first port and a second port, and the first fluid circuit being arranged to allow a flow of the lubricant from the lubricant tank to the component via the first pump and prevent a flow of the lubricant from the component to the lubricant tank; and
   a second fluid circuit comprising a second pump drivably couplable to the fan shaft for pumping the lubricant from the component to the lubricant tank, the second pump having a first port and a second port, and the second fluid circuit being arranged to allow a flow of the lubricant from the component to the lubricant tank via the second pump and prevent a flow of the lubricant from the lubricant tank to the component,
   wherein the first pump receives the lubricant from the lubricant tank through its first port and discharges the lubricant to the component through its second port when the fan shaft rotates in a forward direction, and wherein the first pump receives the lubricant from the lubricant tank through its second port and discharges the lubricant to the component through its first port when the fan shaft rotates in a reverse direction opposite to the forward direction; and
   wherein the second pump receives the lubricant from the component through its first port and discharges the lubricant to the lubricant tank through its second port when the fan shaft rotates in the forward direction, and wherein the second pump receives the lubricant from the component through its second port and discharges the lubricant to the lubricant tank through its first port when the fan shaft rotates in the reverse direction.

2. The system of claim 1, wherein the first fluid circuit comprises:
   a first non-return valve disposed in fluid communication between the second port of the first pump and the component, wherein the first non-return valve allows unidirectional flow from the second port of the first pump to the component;
   a second non-return valve disposed in fluid communication between the first port of the first pump and the component, wherein the second non-return valve allows unidirectional flow from the first port of the first pump to the component;
   a third non-return valve disposed in fluid communication between the lubricant tank and the first port of the first pump, wherein the third non-return valve allows unidirectional flow from the lubricant tank to the first port of the first pump; and
   a fourth non-return valve disposed in fluid communication between the lubricant tank and the second port of the first pump, wherein the fourth non-return valve allows unidirectional flow from the lubricant tank to the second port of the first pump.

3. The system of claim 2, wherein at least one of the first non-return valve, the second non-return valve, the third non-return valve and the fourth non-return valve of the first fluid circuit prevents all fluid flow below a predetermined pressure.

4. The system of claim 3, wherein each of the first non-return valve, the second non-return valve, the third non-return valve and the fourth non-return valve of the first fluid circuit prevents all fluid flow below a predetermined pressure.

5. The system of claim 3, wherein the predetermined pressure is less than or equal to 10 psi.

6. The system of claim 1, wherein the first fluid circuit further comprises a pressure release valve disposed in fluid communication between the first pump and the lubricant tank, and wherein the pressure release valve allows a unidirectional flow from the first pump to the lubricant tank when a fluid pressure in the first fluid circuit exceeds a predetermined value.

7. The system of claim 1, wherein the first fluid circuit further comprises a flow restrictor disposed in fluid communication between the first pump and the component to restrict a flow rate of lubricant from the lubricant tank to the component to a predetermined value.

8. The system of claim 1, wherein the second fluid circuit comprises:
   a first non-return valve disposed in fluid communication between the second port of the second pump and the lubricant tank, wherein the first non-return valve of the second fluid circuit allows unidirectional flow from the second port of the second pump to the lubricant tank;
   a second non-return valve disposed in fluid communication between the first port of the second pump and the lubricant tank, wherein the second non-return valve of the second fluid circuit allows unidirectional flow from the first port of the second pump to the lubricant tank;
   a third non-return valve disposed in fluid communication between the component and the first port of the second pump, wherein the third non-return valve of the second fluid circuit allows unidirectional flow from the component to the first port of the second pump; and
   a fourth non-return valve disposed in fluid communication between the component and the second port of the second pump, wherein the fourth non-return valve of the second fluid circuit allows unidirectional flow from the component to the second port of the second pump.

9. The system of claim 8, wherein at least one of the first non-return valve, the second non-return valve, the third non-return valve and the fourth non-return valve of the second fluid circuit prevents all fluid flow below a predetermined pressure.

10. The system of claim 9, wherein each of the first non-return valve, the second non-return valve, the third non-return valve and the fourth non-return valve of the second fluid circuit prevents all fluid flow below a predetermined pressure.

11. The system of claim 9, wherein the predetermined pressure is less than or equal to 10 psi.

12. The system of claim 1, wherein each of the first pump and the second pump is a bi-directional pump.

13. The system of claim 12, wherein each of the first pump and the second pump is a gear pump.

14. A gas turbine engine for an aircraft, the gas turbine engine comprising:
- a fan shaft rotatable in a forward direction and a reverse direction opposite to the forward direction;
- a component requiring lubrication;
- a lubricant tank located remote from the component; and
- a system for supplying lubricant to a component of a gas turbine engine, the system comprising:
  - a first fluid circuit comprising a first pump drivably couplable to a fan shaft of the engine for pumping a lubricant from a lubricant tank to the component, the first pump having a first port and a second port, and the first fluid circuit being arranged to allow a flow of the lubricant from the lubricant tank to the component via the first pump and prevent a flow of the lubricant from the component to the lubricant tank; and
  - a second fluid circuit comprising a second pump drivably couplable to the fan shaft for pumping the lubricant from the component to the lubricant tank, the second pump having a first port and a second port, and the second fluid circuit being arranged to allow a flow of the lubricant from the component to the lubricant tank via the second pump and prevent a flow of the lubricant from the lubricant tank to the component,
  - wherein the first pump receives the lubricant from the lubricant tank through its first port and discharges the lubricant to the component through its second port when the fan shaft rotates in a forward direction, and wherein the first pump receives the lubricant from the lubricant tank through its second port and discharges the lubricant to the component through its first port when the fan shaft rotates in a reverse direction opposite to the forward direction; and
  - wherein the second pump receives the lubricant from the component through its first port and discharges the lubricant to the lubricant tank through its second port when the fan shaft rotates in the forward direction, and wherein the second pump receives the lubricant from the component through its second port and discharges the lubricant to the lubricant tank through its first port when the fan shaft rotates in the reverse direction,
  - wherein the fan shaft is drivably coupled to the first pump and the second pump, wherein the first pump is operable to pump the lubricant from the lubricant tank to the component, and wherein the second pump is operable to pump the lubricant from the component to the lubricant tank.

15. The gas turbine engine of claim 14, further comprising a gearbox drivably coupled to the fan shaft, wherein the component requiring lubrication is a journal bearing of the gearbox.

16. An aircraft comprising a gas turbine engine, the gas turbine engine comprising:
- a fan shaft rotatable in a forward direction and a reverse direction opposite to the forward direction;
- a component requiring lubrication;
- a lubricant tank located remote from the component; and
- a system for supplying lubricant to a component of a gas turbine engine, the system comprising:
  - a first fluid circuit comprising a first pump drivably couplable to a fan shaft of the engine for pumping a lubricant from a lubricant tank to the component, the first pump having a first port and a second port, and the first fluid circuit being arranged to allow a flow of the lubricant from the lubricant tank to the component via the first pump and prevent a flow of the lubricant from the component to the lubricant tank; and
  - a second fluid circuit comprising a second pump drivably couplable to the fan shaft for pumping the lubricant from the component to the lubricant tank, the second pump having a first port and a second port, and the second fluid circuit being arranged to allow a flow of the lubricant from the component to the lubricant tank via the second pump and prevent a flow of the lubricant from the lubricant tank to the component,
  - wherein the first pump receives the lubricant from the lubricant tank through its first port and discharges the lubricant to the component through its second port when the fan shaft rotates in a forward direction, and wherein the first pump receives the lubricant from the lubricant tank through its second port and discharges the lubricant to the component through its first port when the fan shaft rotates in a reverse direction opposite to the forward direction; and
  - wherein the second pump receives the lubricant from the component through its first port and discharges the lubricant to the lubricant tank through its second port when the fan shaft rotates in the forward direction, and wherein the second pump receives the lubricant from the component through its second port and discharges the lubricant to the lubricant tank through its first port when the fan shaft rotates in the reverse direction,
  - wherein the fan shaft is drivably coupled to the first pump and the second pump, wherein the first pump is operable to pump the lubricant from the lubricant tank to the component, and wherein the second pump is operable to pump the lubricant from the component to the lubricant tank.

* * * * *